United States Patent Office 3,330,836
Patented July 11, 1967

3,330,836
4-AMINO-ISONIPECOTIC ACID
Rudolf G. Griot, Florham Park, N.J., assignor to Sandoz Inc., Hanover, N.J.
No Drawing. Filed Mar. 24, 1964, Ser. No. 354,431
5 Claims. (Cl. 260—294.3)

This invention provides compounds which are interesting not only because they form a novel type of α-amino acid, but also because they are useful as starting materials in the preparation of a new class of heterocyclic compounds, which are useful as tranquilizers and blood pressure reducing agents. The new class of heterocyclic compounds is not the subject matter of this invention.

The compounds of this invention are 4-amino-4-carboxy-piperidines (4-amino-isonipecotic acids)

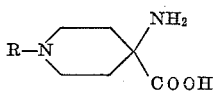
(I)

wherein

R is either a hydrogen atom (—H) or lower alkyl, e.g. methyl, ethyl, propyl, isopropyl and butyl, but preferably methyl, which are prepared by hydrolyzing the corresponding hydantoins. To prepare compound (I) wherein R is a hydrogen atom, i.e. 4-amino-4-carboxy-piperidine (4-amino-isonipecotic acid), it is necessary to stabilize the starting material in the preparation of the corresponding hydantoin to prevent polymerization. A carbobenzoxy grouping (Cbz) is employed for this purpose, and the reaction scheme follows course (A)

(A)
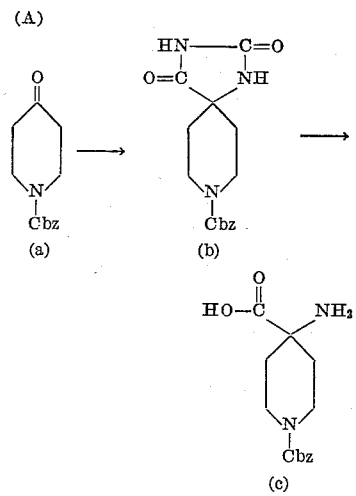

Alternatively, a benzyl group (Bz) protects the 4-piperidone against polymerization and either of the courses (B) is employed.

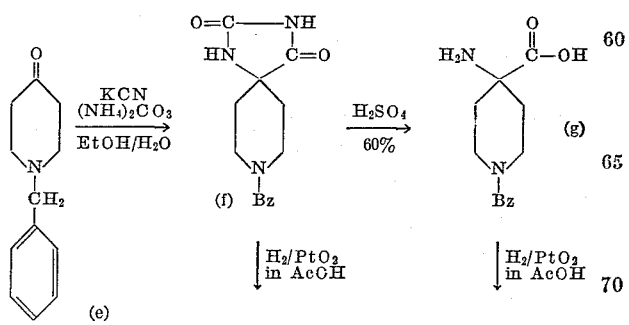

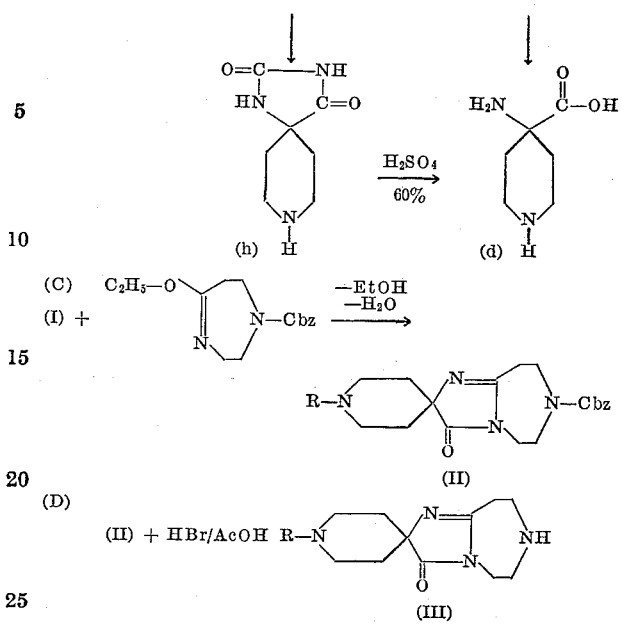

Said new class of heterocyclic compounds is prepared according to the following reaction schemes:

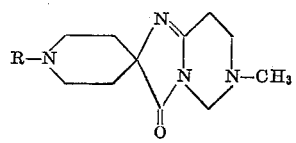

(IV)

wherein

R has the aforesaid meaning, e.g. methyl.

Reaction (C) is conducted under reflux in methanol. The reaction with 1 - carbobenzoxy-5-ethoxy-1,4-diazacycloheptane-Δ4,5 produces about a 45 percent (by weight) yield in twenty-four hours.

Reaction (D) is conducted in concentrated acetic acid. Admixture of (II) with an acetic acid solution of hydrobromic acid results in the production of (III) as a precipitate (in the form of its trihydrobromide).

For reaction (E) the trihydrobromide is converted to its free base according to known procedures, and the free base (dissolved in formic acid) is then admixed with formaldehyde over a boiling water-bath to produce (IV). Compounds (III) and (IV) are members of the noted new class of compounds which have the above-indicated utilities.

In the examples which follow, the parts and percentages are by weight unless otherwise specified, and the temperatures are in degrees centigrade. The relationship between parts by weight and parts by volume is the same as that between the kilogram and the liter.

EXAMPLE 1

*4-amino-4-carboxy-1-methyl-piperidine*

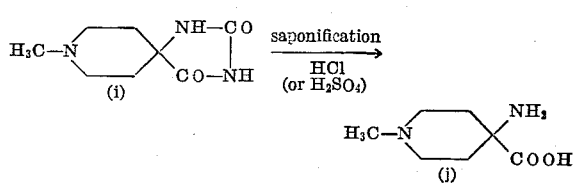

Reflux 22 parts of 8 - methyl - 1,3,8 - triazaspiro[4,5]-decane-2,4-dione [Mailey, Everett A., and Day, Allan R., "J. Organic Chemistry," 22, 1061 (1957)] in 125 parts by volume of 60 percent sulfuric acid for twenty-four hours (oilbath 160°; reaction mixture at about 130°). Cool the resulting clear solution to 20°, and thereafter dilute same with 250 parts by volume of water. Pass the thus-diluted solution slowly through a column (twice the volume of the water of dilution) of DOWEX–50W–X8.

Rinse the ion exchanger sequentially with 100 parts by volume of water and with 1000 parts by volume of methanol. Thereafter elute the amino acid from the ion exchanger with 6000 parts by volume of a 5 percent solution of ammonia ($NH_3$) in methanol.

Evaporate the eluate to dryness. There are thus obtained 13 parts of crystalline title compound, melting point (M.P.) 286° (decomp.)

EXAMPLE 2

*8-carbobenzoxy-1,3,8-triazaspiro[4,5]decane-2,4-dione*

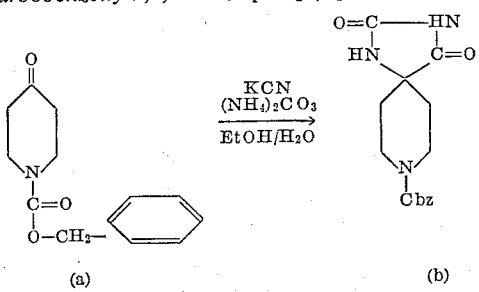

Heat an aqueous ethanol solution of 1-carbobenzoxy-4-piperidone (a) [boiling point (B.P.) 100°/0.05 millimeter (mm.); $\mu_D^{20}$=1.536], ammonium carbonate and potassium cyanide according to the procedure described by Mailey and Day, "Journal of Organic Chemistry," 22, 1061 (1957), and separate the title spirohydantoin (b) accordingly from the resulting reaction mixture.

Compound (f) is prepared from (e) according to the same procedure.

EXAMPLE 3

*1-carbobenzoxy-4-amino-4-carboxy-piperidine*

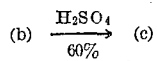

Admix (b) with a 60 percent aqueous sulfuric acid solution and saponify the former. The title compound (c) is thus obtained. Isolate (c) by passing the saponification product through DOWEX–50W–X–8.

Compound (g) is prepared from (f), and compound (d) is prepared from (h) according to this procedure.

EXAMPLE 4

*4-amino-4-carboxy-piperidine*

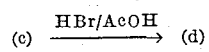

Dissolve (c) in a minimum amount of acetic acid (AcOH). Admix with the resulting solution an excess of hydrogen bromide (in 4 N AcOH) at room temperature for four hours. The dihydrobromide of the title compound (d) is thus obtained. The free base is prepared conventionally therefrom.

Compound (h) is prepared from (f), and compound (d) is prepared from (g) according to the procedure of this example.

The carbobenzoxy group of compound (c) is alternatively removed by hydrogenolytic cleavage with platinum oxide ($PtO_2$) catalyst in AcOH.

It is thought that the invention and its advantages will be understood from the foregoing description. It is apparent that various changes may be made in the intermediates as well as in the final products without departing from the spirit and scope of the invention or sacrificing its material advantages.

What is claimed is:
1. A compound of the formula

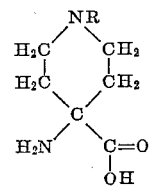

wherein
R is a member selected from the group consisting of a hydrogen atom and lower alkyl.
2. 1-methyl-4-amino-4-carboxy-piperidine.
3. 4-amino-4-carboxy-piperidine.
4. 1-carbobenzoxy-4-amino-4-carboxy-piperidine.
5. 1-benzyl-4-amino-4-carboxy-piperidine.

References Cited
UNITED STATES PATENTS 3,041,344  6/1962  Janssen _____ 260—294.3 X
3,125,574  3/1964  Janssen _____ 260—294
3,238,216  3/1966  Janssen _____ 260—294

WALTER A. MODANCE, *Primary Examiner.*

NICHOLAS S. RIZZO, *Examiner.*

JOSE TOVAR, *Assistant Examiner.*